(12) United States Patent
Matsumora

(10) Patent No.: US 6,630,080 B2
(45) Date of Patent: Oct. 7, 2003

(54) CONDUCTIVE RESIN COMPOSITION AND ENCODER SWITCH USING THE SAME

(75) Inventor: Satoru Matsumora, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 15 days.

(21) Appl. No.: 09/790,841

(22) Filed: Feb. 22, 2001

(65) Prior Publication Data

US 2001/0025065 A1 Sep. 27, 2001

(30) Foreign Application Priority Data

Feb. 25, 2000 (JP) ........................................ 2000-054381

(51) Int. Cl.[7] .............................. C08K 3/04; C08K 3/08; H01B 1/16
(52) U.S. Cl. ...................... 252/503; 252/514; 523/210; 524/440; 200/265
(58) Field of Search ..................... 523/210; 524/440; 252/503, 514; 200/265

(56) References Cited

U.S. PATENT DOCUMENTS 4,419,279 A * 12/1983 Abrams 5,219,494 A 6/1993 Ambros et al.

FOREIGN PATENT DOCUMENTS

| GB | 2202677 | * | 9/1988 |
| JP | 52-038196 | * | 3/1977 |
| JP | 6-338216 | | 12/1994 |

* cited by examiner

Primary Examiner—David J. Buttner
(74) Attorney, Agent, or Firm—Brinks Hofer Gilson & Lione

(57) ABSTRACT

A long-life encoder switch which can enable flexible production in which a wide variety of products are manufactured in low volume is provided by using a conductive resin composition which has both excellent conductivity and abrasion resistance as a material for a contact part. The contact part of the encoder switch is produced by making a pattern of the conductive resin composition by screen printing and the conductive particles of the conductive resin composition contain a conductive powder of carbon beads with silver-coated surfaces and a silver powder.

5 Claims, 3 Drawing Sheets

CONDUCTIVE RESIN COMPOSITION AND ENCODER SWITCH USING THE SAME

BACKGROUND OF THE INVENTION

1. Field of the Invention

The present invention relates to a conductive resin composition having both excellent abrasion resistance and conductivity and an encoder switch having a contact part made from this conductive resin composition.

2. Description of the Related Art

Conventional encoder switches have sliding brushes made from phosphor bronze and contact parts made by punching out radial-shaped parts from phosphor bronze strips and coating the parts with nickel plating and silver plating in succession, wherein the sliding brushes contact the contact parts intermittently when the encoder switches are actuated.

However, the method wherein contact parts are punched from phosphor bronze strips requires production of dies for each shape of contact part, making it difficult to enable flexible production in which a wide variety of products are manufactured in low volume.

SUMMARY OF THE INVENTION

It is an object of the present invention to provide a long-life encoder switch which can enable the flexible production in which a wide variety of products are manufactured in low volume by making a contact part from a conductive resin composition having both excellent conductivity and abrasion resistance.

The conductive resin composition of the present invention comprises a binder resin and conductive particles comprising a conductive powder of carbon (hereinafter referred to as "carbon beads") with silver-coated surfaces and a sliver powder, wherein the ratio of the conductive particles to the total is 74 to 88% by weight.

In such conductive resins, the silver coating acts to impart conductivity to the conductive resin composition and high hardness of the carbon beads, which is a base material, supports load applied to the conductive resin composition and acts to improve the abrasion resistance of the conductive resin composition. The conductive powder is based on carbon beads and is generally spherical without sharp edges, and therefore it does not abrade sliding brushes even if the sliding brushes which slide in contact with the conductive resin composition contact the conductive powder.

The silver powder exists between the conductive powders to increase contact points between the conductive particles and therefore acts to improve the conductivity of the conductive resin composition. The silver powder also acts to smooth the surface of the conductive resin composition by filling gaps between the conductive powders on the surface of the conductive resin composition.

The binder resin disperses the conductive powder and the silver powder of the conductive particles evenly and increases the contact pressure between the conductive particles by hardening and shrinking to reduce the contact resistance between the conductive particles to improve the conductivity.

When the conductive particles constitute 74% by weight or less of the total, the conductive particles are scarce, which decreases the conductivity and abrasion resistance of the conductive resin composition. On the other hand, 88% by weight or more of the conductive particles make patterning of the conductive resin composition difficult by screen printing.

In the conductive resin composition of the present invention, the conductive powder constitutes 1 to 9% by weight of the total.

When the conductive powder constitutes below 1% by weight of the total, the conductive powder cannot fully support load, which results in a decrease in the abrasion resistance of the conductive resin composition. On the other hand, when the ratio of the conductive powder to the total exceeds 9% by weight, the conductive resin composition becomes too hard so that it may abrade the sliding brush that slides in contact with the conductive resin composition.

Furthermore, the above-mentioned sliver powder is a mixture of globular particles and arborescent particles in the conductive resin composition of the present invention.

As for silver powder used in a conductive resin composition, globular particles have lower specific surface area and oil absorption than arborescent particles, therefore more silver powder can be added to a conductive resin composition.

When a lot of silver powder is added, a change in conductivity of the silver powder by sulfidization can be reduced, and sulfidization can be slowed when the powder is left in a sulfidizing atmosphere. On the other hand, the conductive resin composition has less projections and depressions, which reduces contact points between particles and increases the specific resistance of the conductive resin composition.

In such a resin composition, the contact points between silver powder are increased and superior conductivity of the conductive resin composition is obtained while containing more silver powder and maintaining its sulfidization resistance, by mixing globular particles with arborescent particles having a complex shape.

In the conductive resin composition of the present invention, the weight ratio of the globular particles to the arborescent particles is 0.8 to 1.6.

In such a conductive resin composition, since the weight ratio of the globular particles to the arborescent particles is 0.8 or more, the ratio of the arborescent particles having a complex shape to the silver powder is low and therefore more silver powder can be added in the conductive resin, which improves sulfidization resistance. Furthermore, the conductivity of the conductive resin composition can be improved by increasing the ratio of the silver powder in the conductive resin composition. In addition, the conductive resin composition does not need to contain a large quantity of the conductive powder as conductive particles, which prevents the conductive resin composition from being too hard.

Moreover, since the weight ratio of the globular particles to the arborescent particles is 1.6 or less, an appropriate quantity of the arborescent particles is present between the globular particles, which increases contact points between the silver powder having high conductivity to further improve the conductivity of the conductive resin composition.

In the conductive resin composition of the present invention, the binder resin is a thermosetting resin.

In such a conductive resin composition, the thermosetting resin has an appropriate quantity of hydrogen-binding functional groups (e.g., hydroxyl group and amino group) in the resin structure, which allows the conductive resin composition to adhere to a substrate. Use of a thermosetting resin as a binder resin also prevents the conductive resin composition from softening due to ambient temperatures and frictional heat.

In the conductive resin composition of the present invention, the thermosetting resin is a phenolic resin.

In such a conductive resin composition, the phenolic resin undergoes a dehydration condensation and causes sufficient hardening and shrinking to yield a higher contact pressure and a lower contact resistance between the conductive particles to improve the conductivity of the conductive resin composition, compared to when an epoxy resin or the like is used as a binder resin. Examples of the phenolic resin include, for example, resol-type phenolic resins, novolak-type phenolic resins, phenol aralkyl resins, xylene-modified phenolic resins, cresol-modified phenolic resins, furan-modified phenolic resins, epoxy-phenol resins, phenol-melamine resins, phenol-carboimide resins, and resorcinol-modified phenolic resins.

The encoder switch has a sliding brush made of a metal and a contact part which comprises the above-mentioned conductive resin composition and contacts with the sliding brush intermittently.

The conductive resin composition can be patterned by screen printing to provide such an encoder switch and thus facilitates the flexible production system in which a wide variety of products are manufactured in low volume by simply changing masks for screen printing when contact parts of different shape are manufactured. Furthermore, when a contact part is manufactured by screen printing, more complex shapes can be produced than when a metal plate is punched by a die.

Because the contact part is made from a different material from that for the sliding brush, adhesive wear does not occur and therefore an encoder switch with a longer life can be obtained. Moreover, because the contact part is made from the conductive resin composition having excellent abrasion resistance as mentioned above, the contact part will not be abraded by the sliding brush, which also prolongs the life of the encoder switch.

Moreover, because the contact part is made from the conductive resin composition having excellent conductivity as mentioned above, the resistance in the contact part can not be significantly increased even if the contact part is of minute form. Moreover, the surface of the conductive resin composition, which the sliding brush slides on, is even, and therefore noise caused when the sliding brush runs onto salient parts of the sliding surface can be reduced.

Next, embodiments of the conductive resin composition according to the present invention will be described. In the embodiments, the conductive resin composition according to the present invention contains a conductive powder of carbon beads with silver-coated surfaces and a silver powder as conductive particles. The ratio of the conductive particles to the conductive resin composition ranges from 74.6 to 86.7% by weight and the ratio of the conductive powder to the conductive resin composition ranges from 1.1 to 8.8% by weight.

Although the conductive powder which is generally spherical and has a particle diameter of 1 to 30 $\mu$m (the average diameter of 10 $\mu$m) was used, the conductive powder with a particle diameter of 3 to 10 $\mu$m is more preferred. If the particle diameter of the conductive powder is too small, the particles cannot support the load of the sliding brush, which decreases the abrasion resistance of the conductive resin composition. When the particle diameter of the conductive powder is too large, there are problems associated with patterning of the conductive resin composition by screen printing. One problem is that the conductive powder sediments in a conductive ink wherein the conductive particles are dispersed in a resin solution of the binder resin, which reduces stability, and another is that the gauge of a mask for screen printing is coarse, which decreases the patterning precision.

The carbon beads for the conductive powder are obtained by thermally carbonizing resin balls such as phenolic resin and benzoguanamine resin in a rare gas or nitrogen atmosphere. The heating temperature for the carbonization of the thermosetting resin balls is 500 to 1,200° C. When the temperature is below 500° C., carbonization is effected only insufficiently and the hardness of the carbon beads is insufficient. On the other hand, when the temperature exceeds 1,200° C., the carbonized particles, which are carbonized thermosetting resin balls, become opened pomegranate-like matter, not bead-like, due to the distortion caused by reorientation of the molecular structure associated with the carbonization. It is difficult to apply a silver coating on such carbonized particles and edges of the carbonized particles protrude through the surface of the conductive resin composition, which is a cause of abrasion of the sliding brush.

The silver coating applied on the surface of the carbon beads has a thickness of 0.5 $\mu$m. In a thin silver coating with a thickness of 1 $\mu$m or less, silver does not show malleability and behave as a hard coating under the hard base material of carbon beads. When the thickness exceeds 1 $\mu$m, silver shows malleability. Furthermore, the silver coating is produced by plating, and it is required to subject the carbon beads to an activating treatment to introduce active functional groups on the surface for easiness of plating.

The silver powder is a mixture of globular particles and arborescent particles, wherein the globular particles are of an indefinite shape with a particle diameter of 3 to 6 $\mu$m and the arborescent particles have an agglomerated particle diameter of 8 to 15 $\mu$m. In the silver powder, the weight ratio of the globular particles to the arborescent particles is 0.8 to 1.5.

A resol-type phenolic resin was used as the binder resin. The conductive resin composition was produced by preparing with a triple roll mill a conductive ink in which the conductive particles were dissolved in a resin solution of a resol-type phenolic resin in carbitol, producing a pattern of the conductive ink on a substrate by screen printing, and heating the pattern at 200° C. for 20 minutes followed by drying and curing. Carbitol evaporates when the conductive ink is dried, and therefore carbitol is not present in the cured conductive resin composition.

FIG. 1 shows an encoder switch of the present invention in which the conductive resin composition is used. The code disk C comprises a circular substrate 1 having a diameter of about 10 $\mu$m and comprising an insulator such as resins and a contact part 2 comprising the conductive resin composition and produced by screen printing on the substrate 1. The contact part has a common area 2a produced in a ring-shape around the center of the substrate 1, a first contact area 2b extending radially from the common area 2a, and a second contact area 2c extending in a cranked manner from each first contact area 2b. A contact part 2 of this shape would be expensive when produced by punching a metal plate as in the conventional manner because the die for punching the metal plate is of complex shape. In contrast, when the contact part 2 is produced by screen printing, the production costs can be minimized due to the same prices of masks for screen printing regardless of complexity of the contact part 2.

A sliding brush 3 comprising phosphor bronze has a common brush 3a and a first and a second brush 3b and 3c, and the edge of the common brush 3a and the edges of the first and the second brushes 3b and 3c are located in a line such that the common brush 3a and the first and the second brushes 3b and 3c contact the common area 2a and the first and the second contact areas 2b and 2c in the contact part 2, respectively. Furthermore, as shown in FIG. 2, the sliding brush 3 has a bending part 3d at its root in which the common 3a and the first and the second brushes 3b and 3c are bent. This bending part 3d can be formed in a line, when the edge of the common 3a and the edges of the first and the second brushes 3b and 3c are located in a line, thus facilitating the bending process.

When an encoder switch is actuated, the code disk C rotates and the common 3a stays in contact with the common area 2a in the contact part 2 whereas the first and the second sliding brushes 3b and 3c intermittently contact the first and the second contact areas 2b and 2c, respectively. The first and the second contact areas 2b and 2c are configured in a cranked manner, and there is a time difference between the time when the first sliding 3b contacts the first contact area 2b and the time when the second sliding brush 3c contacts the second contact area 2c.

FIG. 3 is a schematic diagram showing the actuation of the encoder switch. The part surrounded by broken lines is the encoder part e composed of the code disk C and the sliding brush 3 and the encoder part e is connected to a pull-up resistor 4 in series and a voltage $V_0$ is placed on the encoder part e and the pull-up resistor 4.

The first switch part e2 in the encoder part e is turned on when the first sliding 3b contacts the first contact area 2b in the contact part 2 and the second switch part e4 is turned on when the second sliding brush 3c contacts the second contact area 2c in the contact part 2. In that case, because the contact part 2 comprises the conductive resin composition having excellent conductivity, the internal resistances e1 and e3 are low and the outputs $V_1$ and $V_2$ in the encoder part e are nearly zero volt.

The first switch part e2 is turned off when the first sliding brush 3b leaves the first contact area 2b in the contact part 2 and the second switch part e4 is tuned off when the second sliding brush 3c leaves the second contact area 2c in the contact part 2. When the first and the second switch parts e2 and e1 are open, the outputs $V_1$ and $V_2$ in the encoder part e are $V_0$, which is placed on the encoder part e and the pull-up resistor 4.

FIG. 4 shows changes in the outputs $V_1$ and $V_2$ in the encoder part e over time in the actuation of the encoder switch. With these waveforms of the outputs $V_1$ and $V_2$, the rotation angle and the rotation direction of the code disk C can be obtained from the number of the on-status (off-status) that is output and the phase difference Δ between the outputs $V_1$ and $V_2$, respectively.

DESCRIPTION OF THE PREFERRED EMBODIMENTS

Table 1 shows the ratios of the binder resin, the conductive powder, the globular silver powder, the arborescent silver powder, and the conductive particles comprising the conductive powder and the silver powder to the total (% by weight), the weight ratio of the conductive powder to the silver powder, the weight ratio of the globular particles to the arborescent particles in the silver powder, and specific resistance for eight conductive resin compositions which are Examples 1 to 9 of the present invention.

TABLE 1

|  | Binder resin (% by weight) | Conductive powder (% by weight) | Globular silver powder (% by weight) | Arborescent silver powder (% by weight) | Conductive particles (% by weight) | Conductive powder/silver powder (weight ratio) | Silver powder: globular/ arborescent (weight ratio) | Specific resistance (×10−4Ω · cm) | Life (in ten thousand cycles) |
|---|---|---|---|---|---|---|---|---|---|
| Example 1 | 15.9 | 2.9 | 46.4 | 34.8 | 84.1 | 0.036 | 1.3 | 1.839 | 20 |
| Example 2 | 15.1 | 1.1 | 50.7 | 33.1 | 84.9 | 0.013 | 1.5 | 1.806 | 15 |
| Example 3 | 17.4 | 6.4 | 38.1 | 38.1 | 82.6 | 0.084 | 1 | 1.847 | 20 |
| Example 4 | 18.5 | 8.8 | 32.3 | 40.4 | 81.5 | 0.121 | 0.8 | 1.904 | 15 |
| Example 5 | 25.4 | 2.6 | 41.1 | 30.9 | 74.6 | 0.036 | 1.3 | 2.374 | 15 |
| Example 6 | 22.7 | 2.7 | 42.6 | 32 | 77.3 | 0.036 | 1.3 | 1.956 | 30 |
| Example 7 | 19 | 2.8 | 44.7 | 33.5 | 81 | 0.036 | 1.3 | 1.928 | 30 |
| Example 8 | 13.4 | 3 | 47.8 | 35.9 | 86.7 | 0.036 | 1.3 | 1.614 | 15 |
| Example 9 | 12.5 | 2 | 53.2 | 32.3 | 87.5 | 0.023 | 1.6 | 1.774 | 15 |

Figure 1:
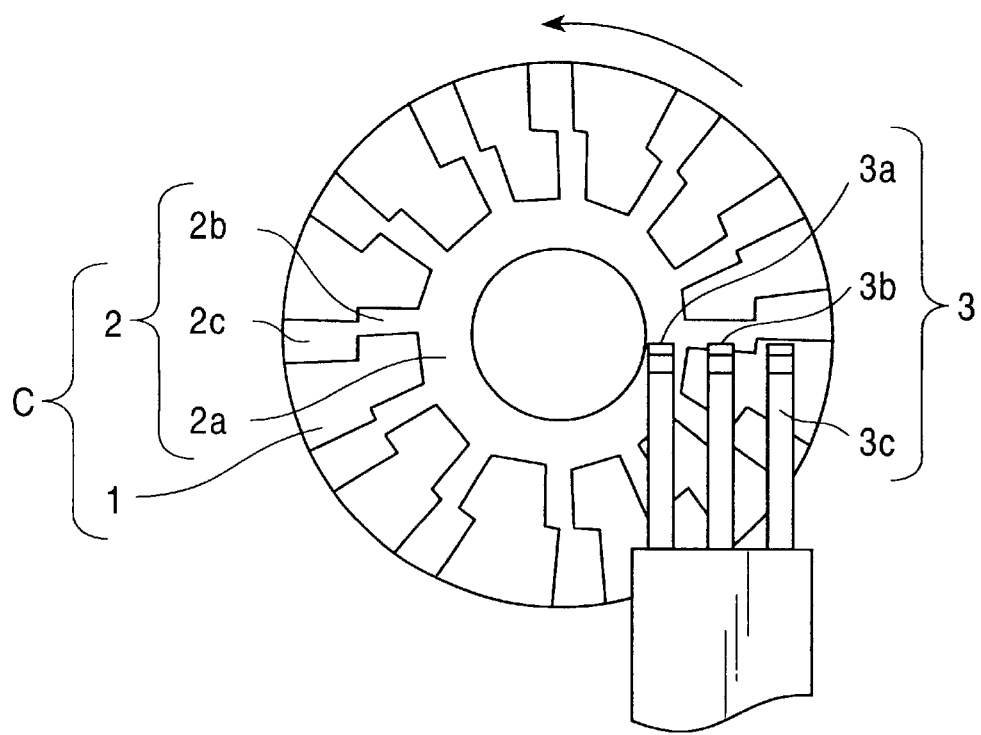
FIG. 1 is an explanatory drawing which shows the encoder of the present invention.
Figure 2:
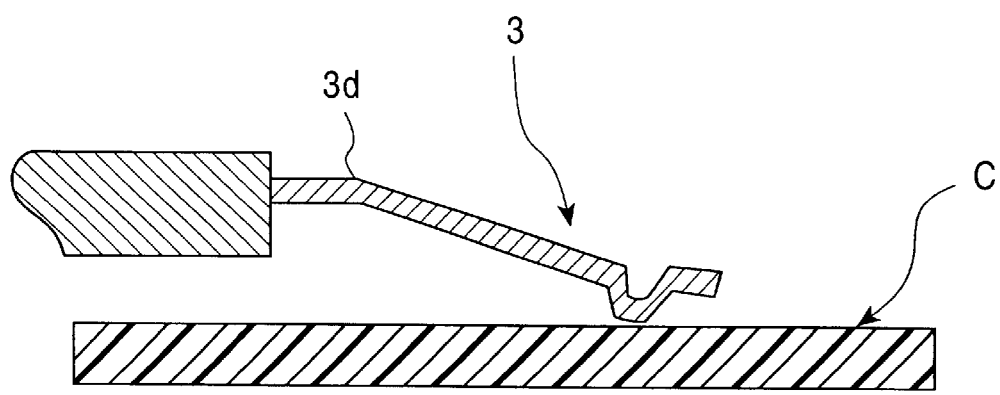
FIG. 2 is a section view of a sliding brush.
Figure 3:
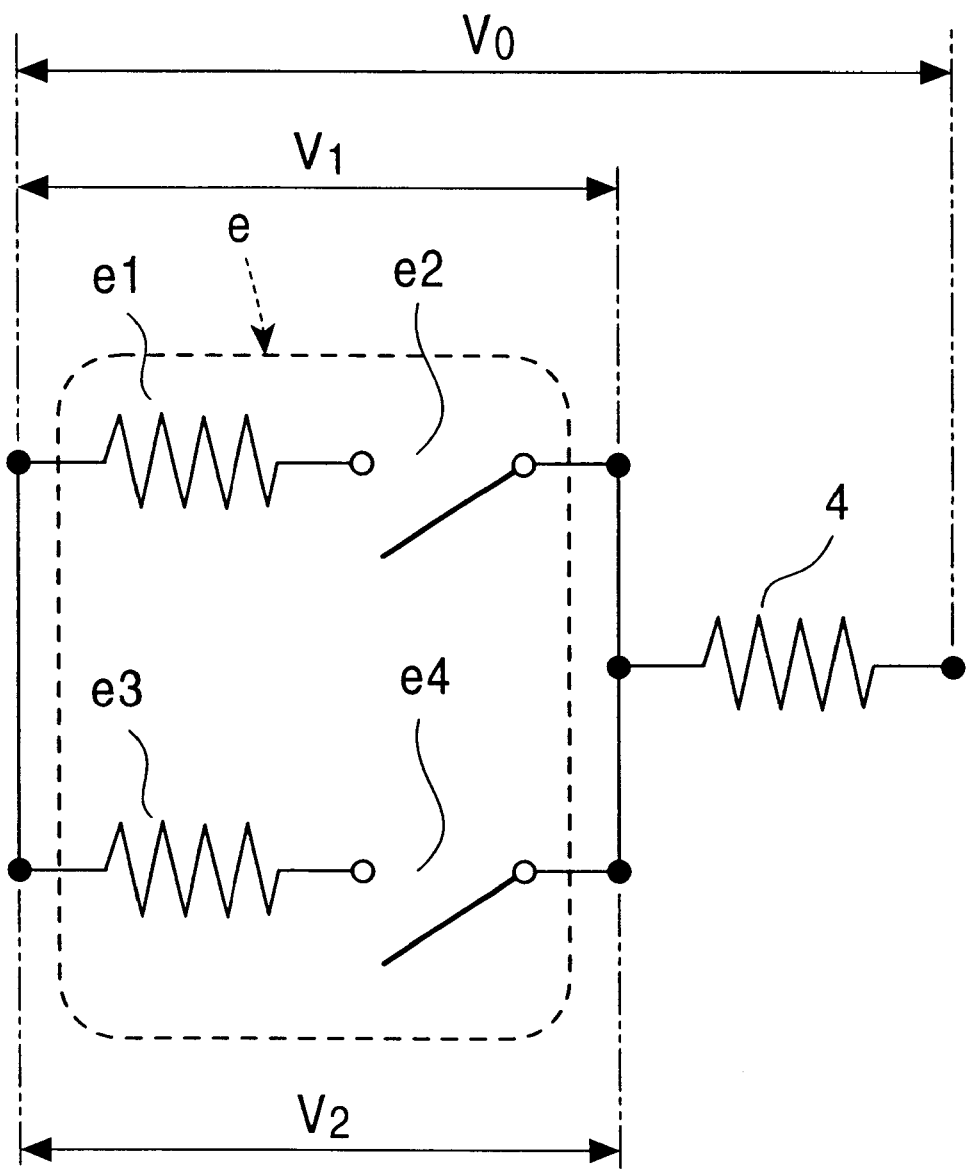
FIG. 3 is a schematic drawing which shows the encoder of the present invention.
Figure 4:
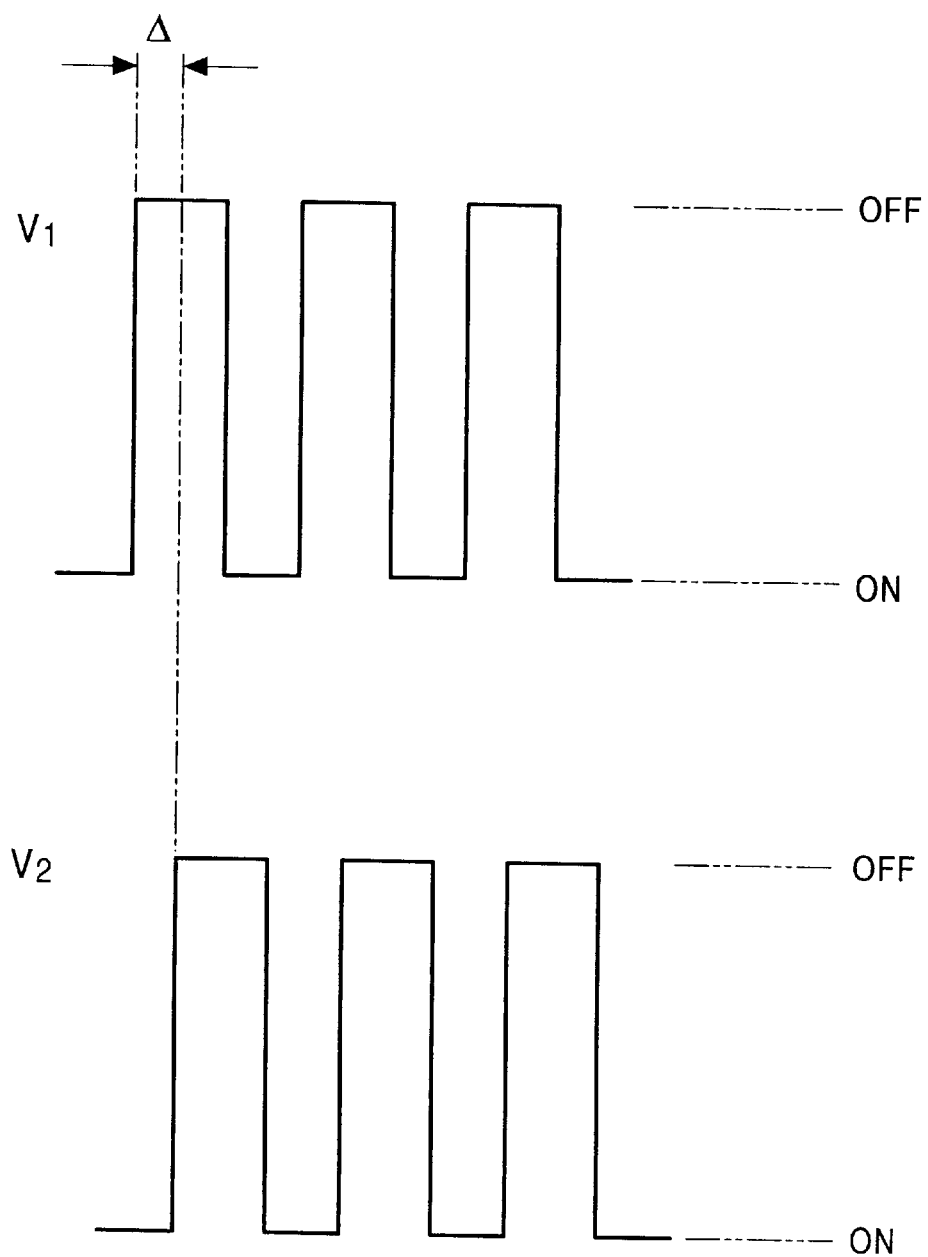
FIG. 4 shows waveforms of the output voltage of the encoder of the present invention.

The life is a number showing how many times the code disk C has to rotate till the proper signal waveforms of the outputs $V_1$ and $V_2$ as shown in FIG. 3 cannot be obtained when a sliding brush 3 comprising phosphor bronze is made to slide in contact with a contact part 2 that is made of each conductive resin composition on the code disk C as shown in FIG. 1 by applying a load of 10 to 15 g on the code disk C.

Incidentally, the volume occupied by the conductive powder and the globular silver powder was set to be constant in the conductive resin compositions. Therefore, when the ratio of the conductive powder to the total increases in Examples 1 to 9, the ratio of the globular silver powder to the total decreases.

Examples 1 and 5 to 8 are the same in terms of the weight ratio of the conductive powder to the silver powder and the weight ratio of the globular particles to the arborescent particles in the silver powder but differ in the ratio of the conductive powder to the total. As the ratio of the conductive powder to the total increases, the specific resistance of the conductive resin composition decreases, and Examples 1, 6, and 7 with the ratios of the conductive particles of 77.3 to 84.1% by weight resulted in a low specific resistance of the order of 1.9×10−4 Ω·cm and a long life of 200,000 cycles.

Example 8, which has the highest ratio of the conductive particles to the total, has the lowest specific resistance. On the other hand, the life in Example 8 is about a half those found in Examples 6 and 7. This is because Examples 6 and 7 had sufficient amounts of the binder resin with reference to the conductive particles, which prevented the conductive resin composition from being abraded by the sliding of the sliding brush and allows the sliding brush to slide smoothly without running on the powder of the abraded conductive resin composition to obtain waveforms with little noise.

The weight ratio of the globular particles to the arborescent particles is 0.8 or more, which contributes to improvement in the sulfidization resistance, and the above-mentioned ratio is 1.6 or lower, which leads to improvement in the conductivity of the conductive resin composition.

COMPARATIVE EXAMPLES

Table 2 shows the ratios of the binder resin, the conductive powder, the globular silver powder, the arborescent silver powder, and the conductive particles comprising the conductive powder and the silver powder to the total (% by weight), the weight ratio of the conductive powder to the silver powder, the weight ratio of the globular particles to the arborescent particles in the silver powder, and specific resistance for the conductive resin compositions of Comparative Examples 1 to 6. The life is defined as above.

coated surfaces. The specific resistance of such a conductive resin composition is relatively low and the output voltage $V_S$ takes a proper waveform as shown in FIG. 3 at the initial stage of actuation. However, after the sliding brush repeatedly slides on the contact part 2 and the silver powder in the conductive resin composition is abraded away, the sliding brush comes into contact with the carbon beads, which increases the contact resistance between the sliding brush and the contact part 2, when the sliding brush and the carbon beads contact, resulting in the occurrence of noise in the waveform. Therefore Comparative Example 2 has a short life of 50,000 cycles or less.

Comparative Example 3

Comparative Example 3 contains only the silver powder as the conductive particles and does not contain the conductive powder of carbon beads with silver-coated surfaces. Such a conductive resin composition has a low hardness with poor abrasion resistance and therefore is abraded by the sliding of the sliding brush, resulting in a short life of 50,000 cycles or less.

Comparative Example 4

Comparative Example 4 contains both the conductive powder of carbon beads with silver-coated surfaces and the

TABLE 2

| | Binder resin (% by weight) | Conductive powder (% by weight) | Globular silver powder (% by weight) | Arborescent silver powder (% by weight) | Conductive particles (% by weight) | Conductive powder/silver powder (weight ratio) | Silver powder: globular/arborescent (weight ratio) | Specific resistance (×10−4 Ω · cm) | Life (in ten thousand cycles) |
|---|---|---|---|---|---|---|---|---|---|
| Comparative Example 1 | 35.8 | 64.2 | 0 | 0 | 64.2 | — | — | 465 | |
| Comparative Example 2 | 16.1 | 1.7(carbon beads) | 47 | 35.2 | 83.9 | — | 1.3 | 2.789 | 5< |
| Comparative Example 3 | 14.6 | 0 | 53.4 | 32 | 85.4 | — | 1.7 | 1.633 | 5< |
| Comparative Example 4 | 19.3 | 10.5 | 28.1 | 42.1 | 80.7 | 0.149 | 0.7 | 1.981 | 5< |
| Comparative Example 5 | 27.4 | 2.5 | 40.4 | 30.3 | 73.2 | 0.035 | 1.3 | 2.781 | 5< |
| Comparative Example 6 | 11.2 | 3.1 | 49 | 36.7 | 88.8 | 0.036 | 1.3 | — | — |

Comparative Example 1

Comparative Example 1 contains 64.2% by weight of the conductive powder as the conductive particles and no silver powder. When the weight of coated silver constitutes 50% of the weight of the conductive powder, the added volume is comparable to that of usual silver pastes since the specific gravity of the conductive powder is about one-fourth that of silver itself. However, Comparative Example 1 has a specific resistance of $464 \times 10^{-4}$ Ω·cm, which is more than a hundred times higher than that found with conventional silver paste. This is attributed to the conductivity of the conductive powder being lower than that of the silver powder and the conductive powder having fewer contact points between the conductive powders due to being generally spherical. This demonstrates that it is essential to use the silver powder in combination with the conductive powder as the conductive particles for the conductive resin composition.

Comparative Example 2

Comparative Example 2 contains the carbon beads and the silver powder as the conductive particles but does not contain the conductive powder of carbon beads with silver-silver powder as the conductive particles, wherein the ratio of the conductive particles to the total is appropriate whereas the ratio of the conductive powder to the total is high. When the ratio of the conductive powder is high, the conductive resin composition is too hard and abrades the sliding brush, resulting in a short life of 50,000 cycles or less. However, a longer life is expected when a sliding brush made of a harder material is used.

Comparative Example 5

Comparative Example 5 contains both the conductive powder of carbon beads with silver-coated surfaces and the silver powder as the conductive particles, wherein the ratio of the conductive particles to the total is as low as 73.2% by weight. Such a conductive resin composition has a high specific resistance and is abraded by sliding of the sliding brush to generate abrasion dust, which adheres to the code disk and becomes a cause of noises when the sliding brush runs onto it. Therefore the life is as short as 50,000 cycles.

Comparative Example 6

Comparative Example 6 contains both the conductive powder of carbon beads with silver-coated surfaces and the silver powder as the conductive particles, wherein the ratio of the conductive particles to the total is as high as 88.8% by weight. When such a conductive resin composition is used, a conductive ink which contains a high concentration of the conductive particles in a resin solution does not show a flowability suitable for screen printing. Therefore an encoder switch could not be produced by screen printing.

What is claimed is:

1. A conductive resin composition comprising a binder resin and conductive particles comprising a conductive powder of carbon beads with silver-coated surfaces and a silver powder, wherein the carbon beads are obtained by thermally carbonizing thermosetting resin balls in a rare gas or nitrogen atmosphere at a temperature of 500 to 1,200° C., wherein the silver powder is a mixture of globular particles and arborescent particles, wherein the ratio of the conductive particles to the total composition is 74 to 88% by weight, and wherein the ratio of the conductive powder to the total composition is 1 to 9% by weight.

2. A conductive resin composition according to claim 1, wherein the weight ratio of the globular particles to the arborescent particles is 0.8 to 1.6.

3. A conductive resin composition according to claim 1, wherein the binder resin is a thermosetting resin.

4. A conductive resin composition according to claim 3, wherein the thermosetting resin is a phenolic resin.

5. An encoder switch comprising a sliding brush comprising a metal and a conductive resin composition according to claim 1, wherein the encoder switch has a contact part that contacts the sliding brush intermittently.

* * * * *